Feb. 26, 1957 L. J. NAUROTH 2,782,945
FROZEN CONFECTION CONVEYING SYSTEM
Filed July 17, 1953 6 Sheets-Sheet 5
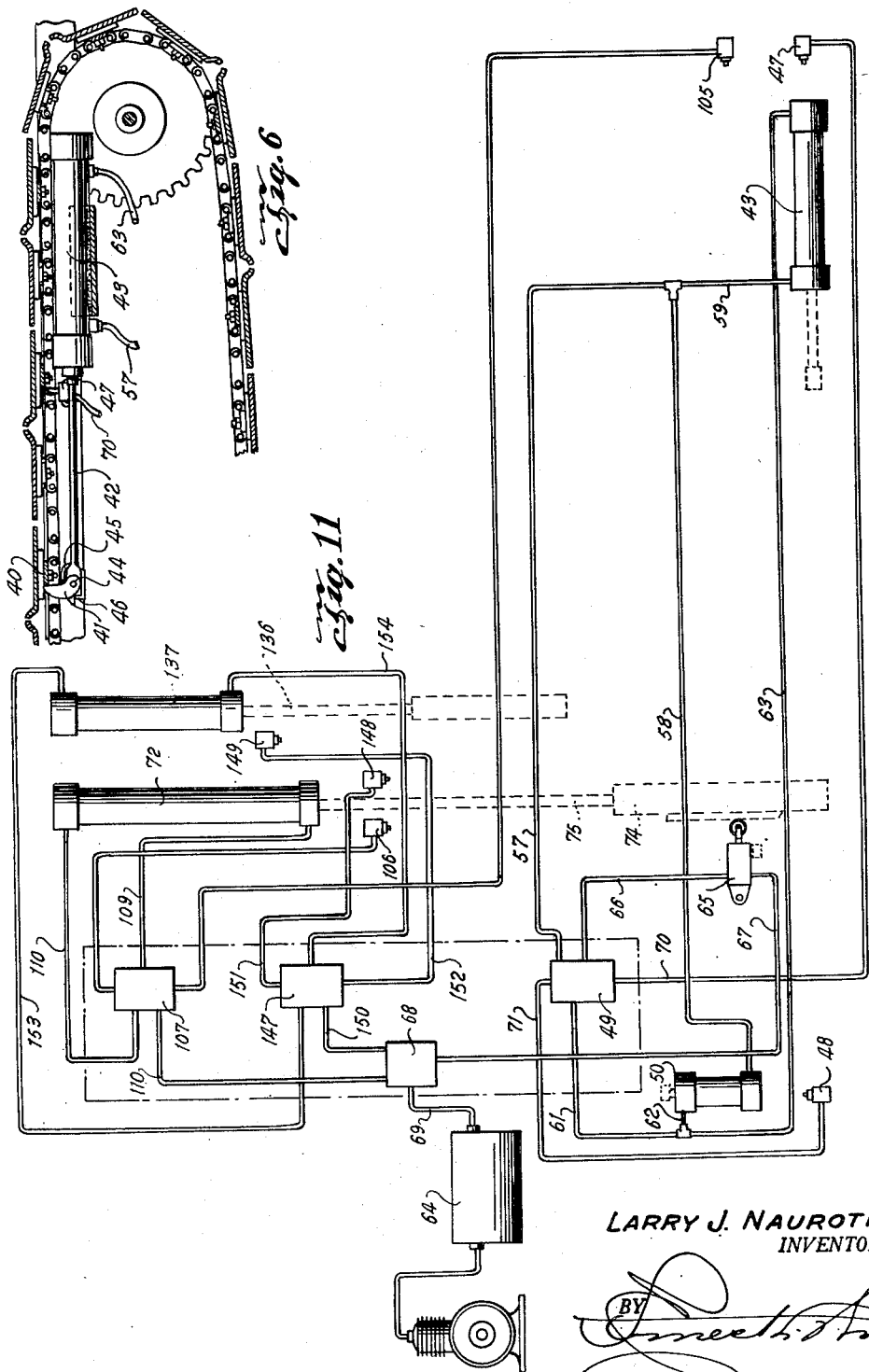
LARRY J. NAUROTH
INVENTOR.
BY
ATTORNEY Feb. 26, 1957 L. J. NAUROTH 2,782,945
FROZEN CONFECTION CONVEYING SYSTEM
Filed July 17, 1953 6 Sheets-Sheet 6
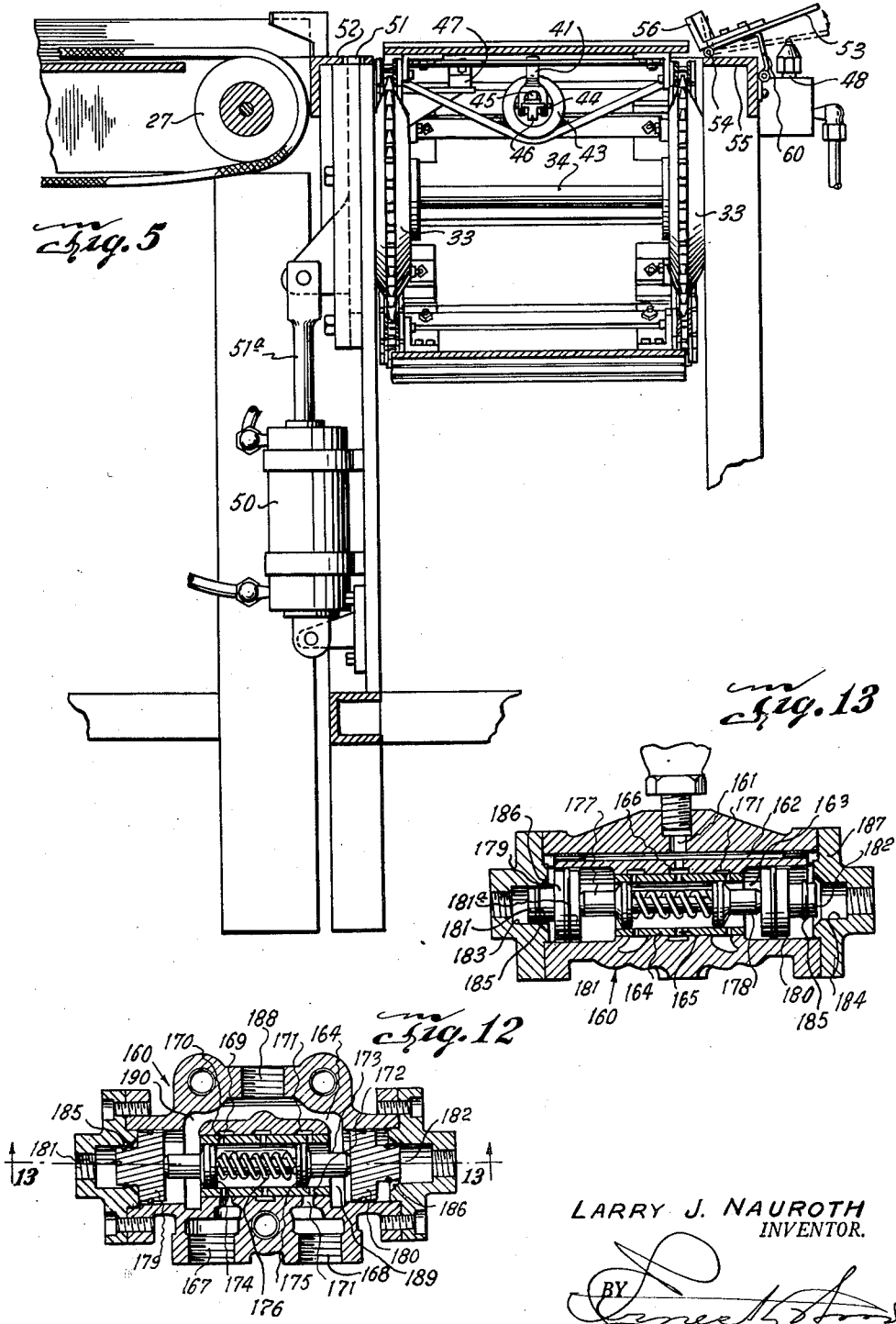
LARRY J. NAUROTH
INVENTOR.
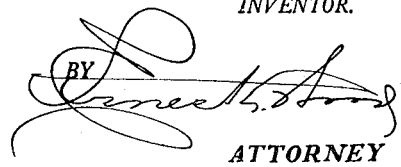
ATTORNEY United States Patent Office 2,782,945
Patented Feb. 26, 1957

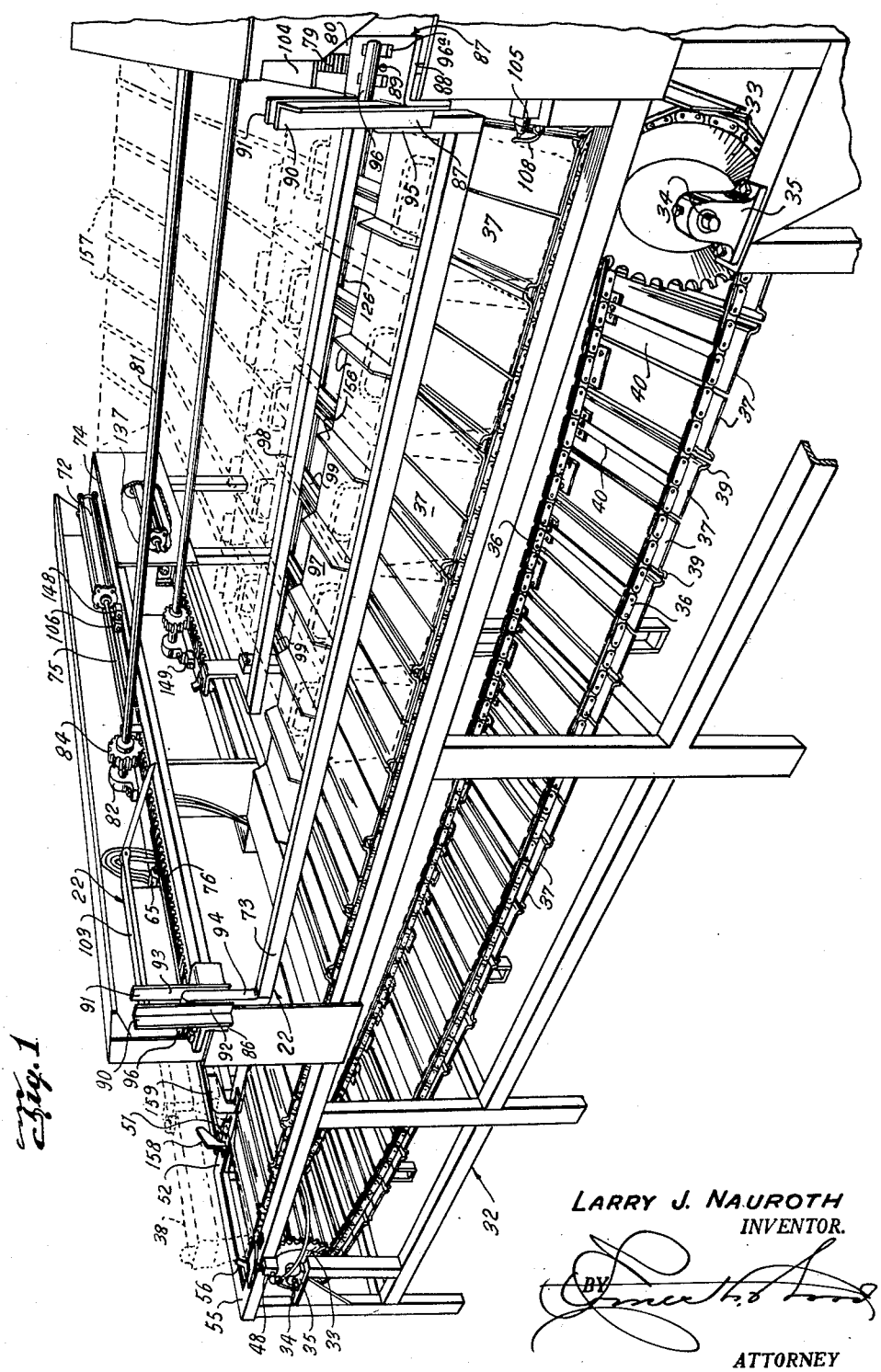

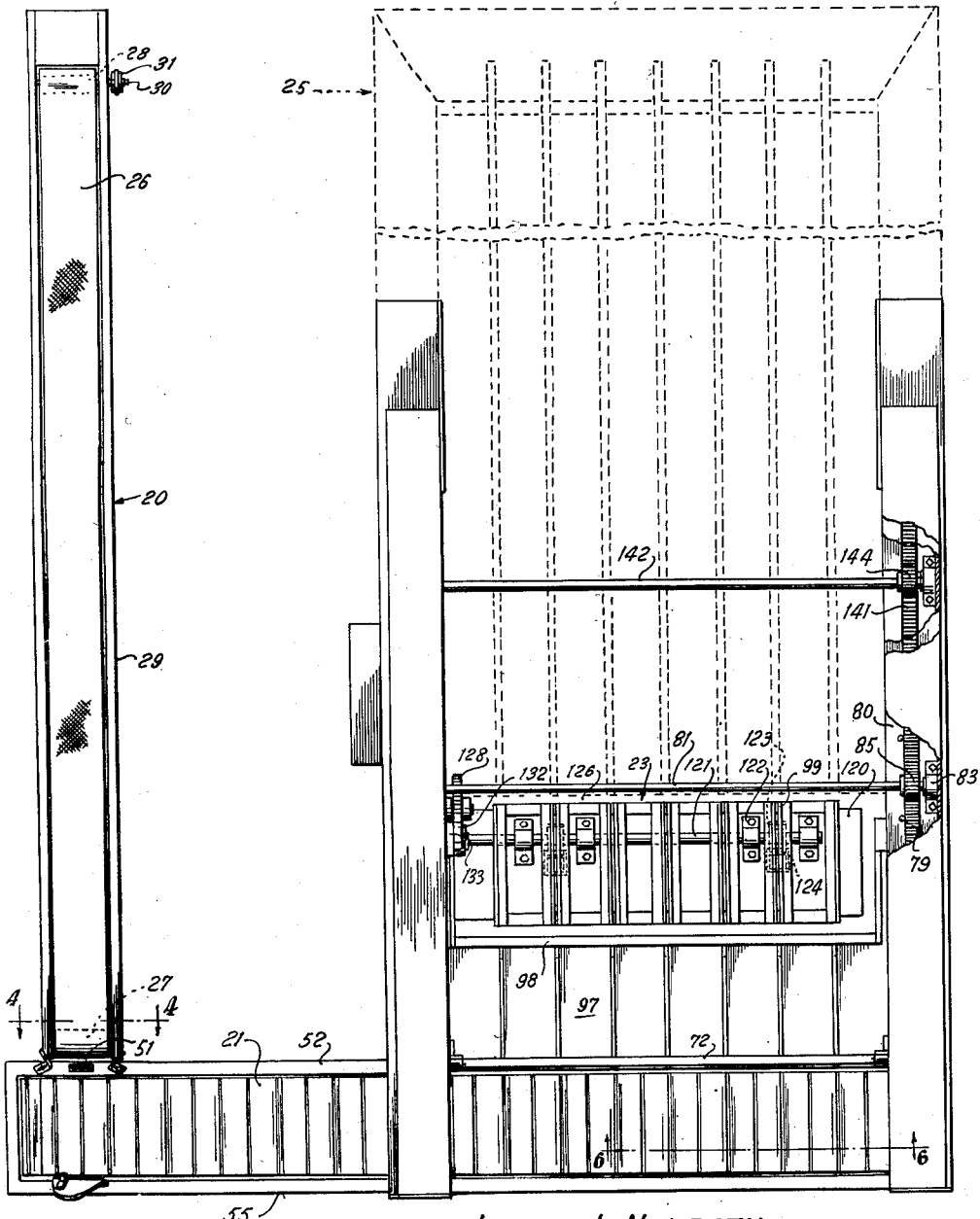

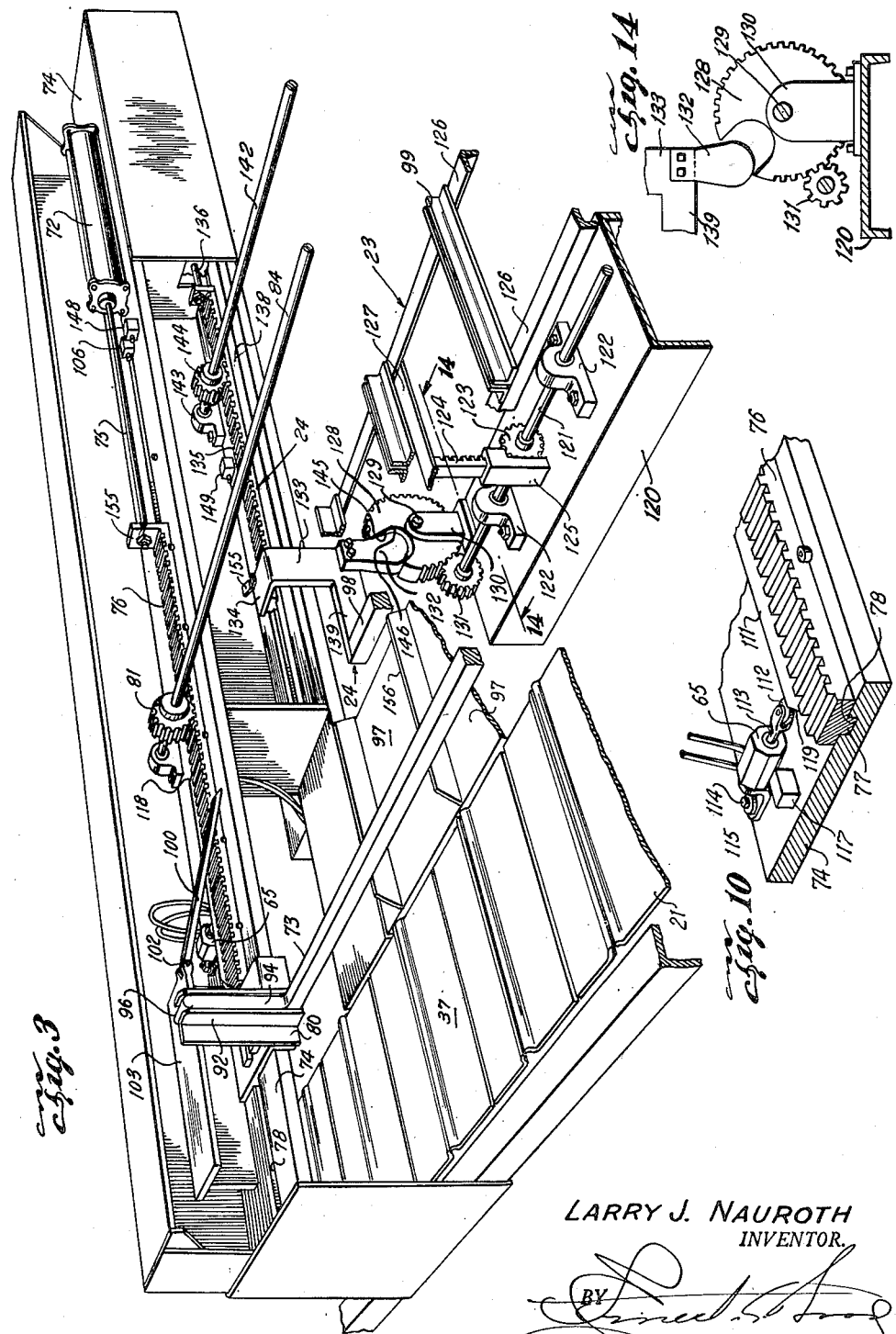

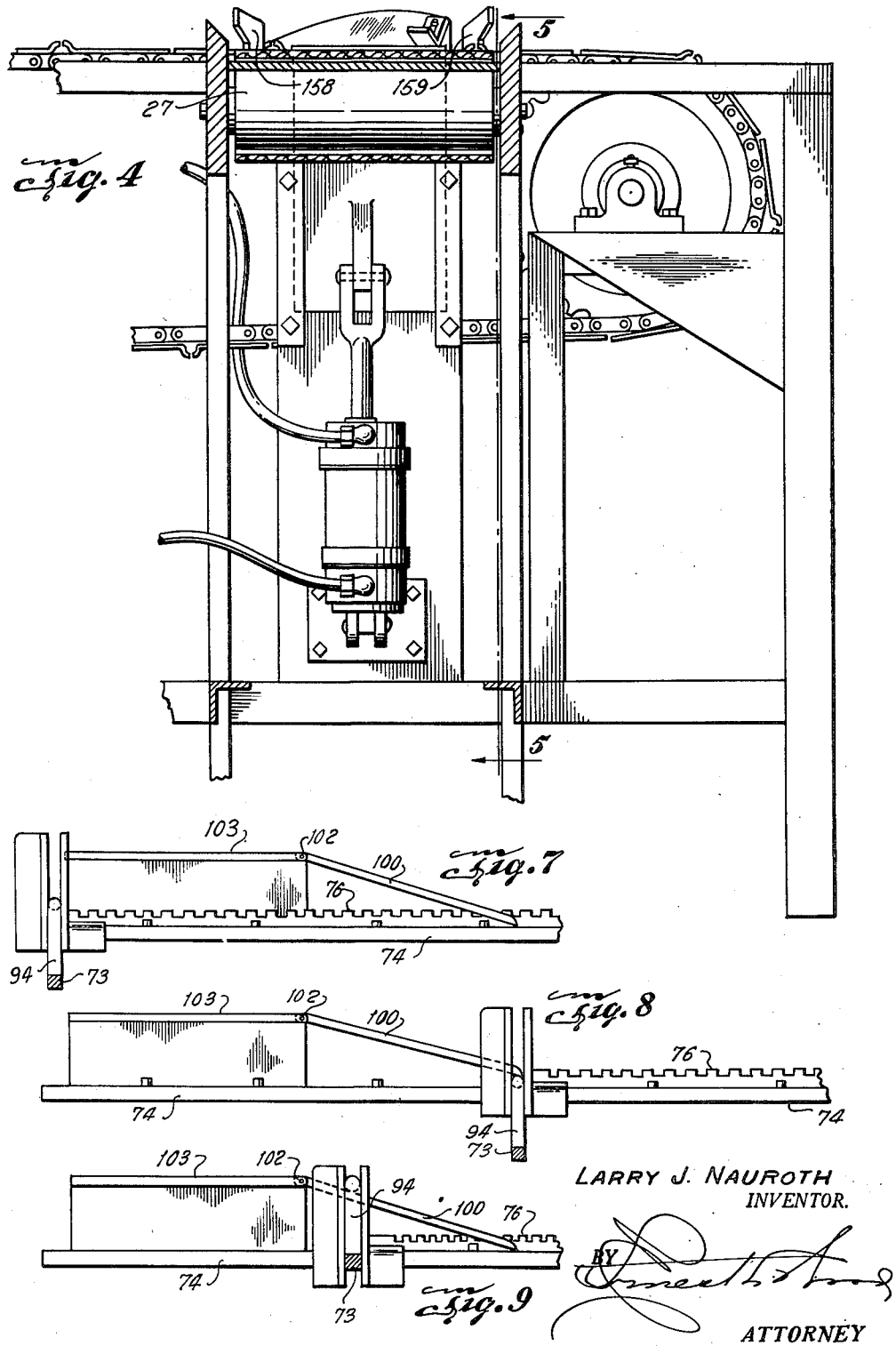

2,782,945

FROZEN CONFECTION CONVEYING SYSTEM

Larry J. Nauroth, Dallas, Tex., assignor to Joe Lowe Corporation, New York, N. Y., a corporation of Delaware Application July 17, 1953, Serial No. 368,801

14 Claims. (Cl. 214—89)

This invention relates to conveyer systems and more particularly to an automatically operated conveyer system.

An object of the invention is to provide a new and improved conveyer system for moving articles from a loading conveyer into a tank.

Another object of the invention is to provide a new and improved conveyer system for moving articles in predetermined numbers from a loading conveyer into a tank.

Still another object of the invention is to provide a new and improved conveyer system having an intermediate conveyer to which articles are delivered by the loading conveyer, and a pusher assembly for moving articles from the intermediate conveyer to a lowering assembly which lowers the articles into a tank.

A further object of the invention is to provide, in the above conveyer system, means for automatically operating the conveyers and assemblies in synchronism to receive articles from the loading conveyer and deposit them in the tank.

A still further object of the invention is to provide, in the above conveyer system, a second pusher assembly for moving the articles off the lowering assembly.

Another object of the invention is to provide a new and improved automatically operating conveyer system for moving containers having confections to be frozen from a loading conveyer into a freezing tank wherein the confections are frozen.

With the foregoing objects in view, the invention has further reference to certain features of accomplishment which will become apparent as the description proceeds, taken in connection with the accompanying drawings wherein:

Figure 1 is a perspective view, with some parts broken away, of a conveyer system for delivering containers into a tank;

Figure 2 is a top plan view, with some parts broken away, of the system shown in Figure 1;

Figure 3 is an enlarged fragmentary view of a portion of the system shown in Figures 1 and 2;

Figure 4 is a vertical sectional view taken on line 4—4 of Figure 2;

Figure 5 is a vertical sectional view taken on line 5—5 of Figure 4;

Figure 6 is a fragmentary vertical sectional view taken on line 6—6 of Figure 2;

Figures 7, 8 and 9 are fragmentary side elevations showing a pusher assembly at various progressive stages of its cycle of operation;

Figure 10 is a fragmentary perspective view showing one of the control switches of the conveyer system;

Figure 11 is a diagrammatic illustration of the pneumatic driving system of the conveyer system;

Figure 12 is a sectional view of one of the control valves of the pneumatic driving system;

Figure 13 is a sectional view taken on the line 13—13 of Figure 12, and

Figure 14 is a transverse section taken substantially along the line 14—14 of Figure 3, looking in the direction of the arrows.

Referring now to the drawing, the conveyer system includes a loading conveyer 20 for delivering containers to an intermediate conveyer 21, an upper pusher assembly 22 for moving the containers off the intermediate conveyer to a lowering assembly 23, and a lower pusher assembly 24 for moving the containers off the lowering assembly into a tank 25.

The loading conveyer 20 may be of any suitable type such as that employing an endless belt 26 extending about an idler roller 27 and a driving roller 28 which are mounted on a suitable base frame 29. The driving roller may be mounted on a shaft 30 which is provided with a pulley 31 by means of which the shaft 30 is rotated by an electric motor (not shown) or any other suitable driving means.

The delivering end of the loading conveyer is adjacent the load receiving end of the intermediate conveyer 21 which is mounted on a frame 32. Two pairs of sprockets 33 are rotatably mounted adjacent opposite ends of the frame 32 by means of shafts 34 journalled in pillow blocks 35 and the endless chains 36 of the intermediate conveyer extend about the sprockets. A plurality of pairs of support plates 37 are mounted on and extend between the chains 36 to receive and convey containers 38. Opposite side edges of each pair of support plates are provided with flanges 39 which prevent the containers from longitudinal displacement on the intermediate conveyer.

The chains 36 are also connected by a plurality of transverse straps 40 which are adapted to be engaged by a pawl 41 on the end of the piston rod 42 of a pneumatic ram 43 mounted on the frame 32. The pawl 41 is pivotally mounted on the end of the piston rod, as at 44, and is biased upwardly toward a strap 40 engaging position by a spring 45. Its pivotal movement is limited by a stop 46 so that when the pawl is in the position shown in Figure 6 and the piston rod 42 is retracted, the pawl will pull the strap 40 and thus advance the intermediate conveyer. When the piston rod is next extended, the pawl will pivot downwardly against the resistance of the spring 45 as it passes beneath the next strap 40 and will then be moved upwardly to the position shown in Figure 6 wherein it will be effective to move the conveyer again when the piston rod 42 is again retracted.

The operation of the pneumatic conveyer ram 43 is governed by a pair of bleeder valves or switches 47 and 48 which control a four-way valve 49 which in turn controls the flow of compressed air to the conveyer ram 43 and the slide stop ram 50.

The slide stop ram 50 is also mounted on the frame 32 and its piston rod 51a is connected to a slide stop 51 which is movable upwardly through a suitable aperture in the side member 52 of the frame 32 between the loading conveyer and the intermediate conveyer to prevent the delivery of containers to the intermediate conveyer when a container 38 is disposed on the intermediate conveyer and pivots a switch plate 53 downwardly to actuate the switch 48. The switch plate 53 is pivoted, as at 54, to the side member 55 of the frame 32 and is provided with an angle member 56 which is engaged by the forward end of a container moved onto the intermediate conveyer by the loading conveyer, the engagement of the angle member 56 with the container pivoting the switch plate downwardly to actuate the switch 48 when the container is properly positioned on the rearmost pair of support plates 37. When the switch 48 is actuated, the control valve admits compressed air to the slide stop ram 50 and the conveyer ram 43 through the conduits 57, 58 and 59 so that the slide stop is raised to prevent another container to be delivered to the intermediate conveyer while the latter is being simultaneously moved by the conveyer ram 43 since the piston rod 42 is retracted simultaneously with the upward movement of the piston rod 51a of the slide stop ram 50.

When the intermediate conveyer is moved a certain distance by the conveyer ram, the container 38 is moved out of engagement with the angle member 56 and the switch plate is moved to actuating position by a leaf spring 60 but the movement of the intermediate conveyer is continued until one of the straps 40 contacts and actuates the switch 47. This causes the control valve to admit compressed air to the conveyer ram 43 and the slide stop ram 50 through the conduits 61, 62 and 63 so that the piston rod 51a of the slide stop ram is retracted downwardly to move the slide stop 51 down to permit the next container 38 to move off the loading conveyer to the next pair of support plates 37 of the intermediate conveyer which have been advanced to container receiving position by the conveyer ram.

At the same time, the piston rod 42 of the conveyer ram is moved to extended position wherein it engages the next strap 40 of the intermediate conveyer so that when the next container 38 is moved off the loading conveyer into the next pair of support plates 37 to actuate the switch 48, this cycle of operation is repeated until the control valve 49 is shut off from the source or tank 64 of compressed air by the closure of the valve 65. The valve 65 connects the control valve to the tank 64 through conduits 66 and 67, the distributing block 68 and the conduit 69. The switches 47 and 48 are connected to the control valve 49 by conduits 70 and 71, respectively.

The valve 65 closes when the upper pusher assembly 22 ram 72 is operated to push the containers 38 off the intermediate conveyer onto the lowering assembly 23 to stop movement of the intermediate conveyer while the pusher bar 73 is traveling transversely across the intermediate conveyer. The upper ram 72 is mounted on a transverse member 74 of the frame 32 which extends above the intermediate conveyer and has a piston rod 75 whose outer end is secured to a rack gear 76 slidably mounted on the transverse member. The rack gear is provided with a longitudinal guide or tongue 77 which is received in a corresponding guide groove 78 in the transverse member.

A corresponding rack gear 79 is mounted on second transverse member 80 parallel to and spaced from the first transverse member. The rack gear 79 is slidably mounted on the transverse member 80 by a similar tongue and guide groove connection.

The two rack gears are connected for simultaneous identical movement by a shaft 81 journalled in pillow blocks 82 and 83 on the transverse members 74 and 80, respectively, and pinion gears 84 and 85 rigidly mounted on the shaft 81 and meshing with the rack gears 76 and 79, respectively.

Pusher bar brackets 86 and 87 are secured to the outer ends of the racks 76 and 79, respectively. Each of the brackets includes an angle member 88 secured to the end of its rack gear 76 or 79 by screws 89. A pair of vertical spaced guides 90 and 91 are rigidly secured to the angle member by welding or in any other conventional manner. The guides 90 and 91 may have legs 92 and 93, respectively, which form two sides of a chute or guide slot in which the vertical end pieces 94 and 95 attached to the pusher bar 73 are adapted to slide vertically. The end pieces in turn are provided with laterally and outwardly extending supporting rods 96 which extend beyond the guides 90 and 91 and are adapted to rest upon the shock absorbent pads 96a, of rubber or other resilient substance, secured to the angle members 88 of the pusher bar brackets.

It will be seen now that the pusher bar 73 is movable transversely over the intermediate conveyer 21 to push containers off the supporting plates 37 of the intermediate conveyer onto a platform 97 mounted on the frame 32 on the same or slightly lower level than the intermediate conveyer and from the platform over the lower pusher bar 98 of the lower pusher assembly 24 onto the transverse angle members 99 of the lowering assembly 23. It will be observed in Figure 3 that the lower pusher bar 98 is disposed on a plane below that of the platforms 97 and the angle members 99 so that it will not obstruct transfer of the containers onto the transverse members 99.

In order to raise the upper pusher bar 73 during its movement back toward and over the intermediate conveyer, a pair of ramps 100 are disposed on the transverse members 74 and 80 with their lower ends resting on the transverse members and their upper ends pivotally secured, as at 102 to slide shelves 103 and 104. As the upper ram 72 retracts its piston rod 75, the pusher bar 73 moves under and past the ramps and the laterally extending rods 96 move past the lower ends of the ramps and in so doing engage and raise the ramps (Figure 8) which then fall back to their original positions. When the direction of movement of the piston rod is reversed, the rods 96 slide up on the ramps 100 and onto the shelves 103 and 104, the pusher bar 73 naturally rising also. The pusher bar 73 then rides over any containers which may have been brought beneath it during further movements of the intermediate conveyer until it reaches the ends of the slide shelves whereupon the pusher bar 73 drops down to its original position, the pads 96a cushioning the shock of the fall.

The operation of the pneumatic ram 72 is controlled by two bleeder valves or switches 105 and 106 of the four-way control valve 107. The switch 105 is mounted on the frame 32 adjacent the right end of the intermediate conveyer and is actuated by a container 38 on the support plates 37 of the intermediate conveyer nearest the rack gear 79. A spring 108 may be placed adjacent the switch 105 so that the spring must be flexed by the container before the switch 105 may be actuated. When the switch 105 is actuated by a container, the control valve supplies compressed air to the upper ram 72 through the conduit 109. The control valve 107 is in turn supplied with compressed air through conduit 110, the distributing block 68, and the conduit 69. When air is supplied to the ram 72 through the conduit 109, the piston rod 75 of the ram is retracted to move the rack gears 76 and 79 away from the intermediate conveyer, thus moving the pusher bar 73 toward the tank. The pusher bar, of course, pushes the containers 38 off the conveyer, thus permitting the switch 105 to move to non-actuated position.

When the piston rod 75 is fully retracted, the switch 106 is actuated to cause the control valve 107 to now supply compressed air to the ram 72 through the conduit 110. This causes the piston rod 75 to move to extended position and thus move the pusher bar 73 back to its original position.

The rack gear 76 is provided with a cam 111, Figure 10, which contacts a roller 112 on the outwardly biased actuating plunger 113 on the valve 65. The valve 65 is pivoted by means of a bolt 114 which holds the rear end of the bracket 115 of the valve to the transverse member 74. The valve is adapted to abut a stop 117 which limits the clockwise pivotal movement of the valve 65. The valve 65 is open when the cam 111 and gear rack 76 are in the position shown in Figure 1 wherein the pusher bar 73 is in its extreme outward position ready to push containers 38 off the intermediate container. With valve 65 open, the conveyer ram 43 and the slide stop ram 50 are free to operate to allow containers to move off the loading conveyer to the intermediate conveyer and at the same time move the intermediate conveyer to bring the containers in front of the pusher bar 73. When the switch 105 is actuated, however, the rack gear 76 is retracted toward the ram 72, the valve 65 is rotated slightly in a counterclockwise direction due to the movement of the cam 111, the plunger 113 moves outwardly and the valve closes to render the rams 47 and 50 inoperative. This holds the intermediate conveyer stationary while the pusher bar 73 is moving containers off the conveyer onto the platform and thence onto the lowering assembly.

The valve 65 remains closed until the direction of movement of the rack 76 is reversed. At this time, the inclined end 119 of the cam 111 engages the roller 112 and pivots the valve 65 clockwise until the valve 65 engages the stop 117. The plunger 113 then moves inwardly slightly to open the valve 65 to permit the wheel 116 to ride over the inclined end 119 of the cam as the movement of the rack gear continues. The valve 65 then remains open until the gear rack 76 again is moved toward the ram 72.

The lowering assembly 23 includes a base channel member 120 mounted in the tank 25 on which is rotatably mounted shaft 121 by means of pillow blocks 122. A pair of gears 123 rigidly mounted on the shaft 121 are in mesh with a pair of vertical rack gears 124 slidably mounted in brackets 125, the rack gears being movable downwardly through suitable apertures in the base channel member. The vertical rack gears support a rectangular frame formed by a pair of side members 126 formed of angle iron, each rack gear being secured to a transverse member 127 extending between the side members. The transverse angle members 99 are also secured to the side members 126 by welding or in any other suitable manner.

The containers which are pushed onto and supported by pairs of the angle members 99 are lowered when the shaft 121 is rotated by a cam gear 128, mounted on a shaft 129 rotatably journalled in the pillow blocks 130, which is in mesh with a gear 131 rigidly secured to the shaft 121. The cam is rotated by a cam member 132 rigidly secured to a bracket 133. The bracket 133 has an upper horizontal portion 134 secured to the end of a gear rack 135 whose other end is secured to the piston rod 136 of a pneumatic ram 137. The gear rack 135 is slidably mounted on a transverse member 138 disposed below the transverse member 74.

The bracket 133 also has a lower extension 139 to which is secured one end of the lower pusher bar 98. The other end of the lower pusher bar is secured to a similar bracket fixed to one end of a corresponding rack gear 141 which is connected to the rack gear 135 by means of a shaft 142 journalled in pillow blocks 143 and having fixed gears 144 which mesh with the rack gears 135 and 141.

It will now be seen that as the piston rod 136 of the pneumatic ram is retracted, the lower pusher bar 98 will push the containers off the transverse angle members 99 of the lowering assembly and at the same time the transverse angle members will be lowered so that the containers will be pushed completely off the angle members 99 only when the latter are near the bottom of the tank. The containers will of course tilt somewhat as they are pushed off the angle members but at a relatively small angle. When the piston rod 136 is moved to extended position, the lower pusher bar 98 will move back to its original position and at the same time the vertical rack gears 124 will move upwardly so that the transverse angle members will again be in position to receive containers pushed off the platform 97 by the upper pusher bar 73. It will be observed that the cam gear 128 has an annular recess originating at its periphery which receives the lobular bottom portion of the cam member 132. Therefore rotation of the cam gear is caused by the engagement of the curved camming surface 145 defined by the annular recess in the cam gear 128 by the curved lower cam surface 146 of the cam member 132, when the gear rack 135, from which the cam member 132 is suspended, is reciprocated longitudinally in the manner explained.

The movement of the piston rod 136 of the ram 137 is controlled by a suitable fourway control valve 147 which in turn is controlled by the bleeder valves or switches 148 and 149. The control valve 147 is connected to the compressed air storage tank 64 through the distributing block 68 and the conduit 150. The switches 148 and 149 are connected to the valve by conduits 151 and 152, respectively, while the opposite ends of the ram 137 are connected to the valve by conduits 153 and 154.

The switch 148 is mounted on the transverse member 74 adjacent the switch 106 so that it is actuated at the same time as the switch 106 by the vertical flange 155 of the horizontal portion 134 of the bracket 133 as the piston rod 75 of the upper ram 72 approaches its fully retracted position. When the switch 148 is actuated, the control valve 147 admits compressed air to the ram 137 through the conduit 154 and the piston rod 136 is retracted. This causes the lower pusher bar 98 to contact the rear ends of the containers 38 on the angle members 99 and move them off the angle members as the latter are lowered to the bottom of the tank. When the piston rod 136 approaches its fully retracted position and the containers have been pushed off the angle members 99 onto the bottom of the tank, the extension 155 of the bracket 133 actuates the switch 149. When the switch 149 is actuated, the control valve admits compressed air to the ram 137 through the conduit 153 whereupon the piston rod 136 is moved to extended position, the lower push bar 98 moving back to its original position and the lowering assembly 23 moving to its raised position.

It will be noted that the platform 97 and the bottom wall of the tank are provided with separator members 156 and 157, respectively, which are aligned with the transverse angle members 99 of the lowering assembly or mechanism and the raised flanges 39 of the supporting plates 37 of the intermediate conveyer so that the containers are guided for straight line movement while being pushed by either of the two pusher bars.

Assuming now, that the system is to be placed into operation to move containers 38 in groups of eight, through the tank 25 which may be partly filled with a freezing liquid, the containers 38, filled with the confection to be frozen are placed on the loading conveyer 20 and are carried thereby to the intermediate conveyer. Since no container is on the pair of supporting plates 37 of the intermediate conveyer which are adjacent the slide stop 51, the latter is in its lower position. The first container 38 is thus allowed to be pushed by the loading conveyer over the slide stop, being guided in this movement by the guides 158 and 159 secured to the member 52 of the frame 32. The second container on the loading conveyer then pushes the first container fully onto the supporting plates and into engagement with the angle member 56 whereupon the switch 48 is actuated. The rams 43 and 50 are now supplied with compressed air and the slide stop 51 is raised to engage the second container and prevent it from being pushed onto the intermediate conveyer while the latter is being moved by the ram 43. It will be noted that the end walls of the conveyer are inclined upwardly and outwardly so that the slide stop may be interposed between the lower portions of the adjacent end walls of two containers while the upper portions are in contact with on another. This permits the second container to push the first fully onto a pair of supporting plates 37 of the conveyer and still permit the slide stop 51 to prevent the second container from moving onto the conveyer.

When the conveyer ram 43 advances the conveyer, the first container moves out of engagement with the angle member 56 of the switch plate 53 so that when the switch 47 is actuated by one of the straps 40, the slide stop moves downwardly and allows the second container to move onto the next succeeding pair of supporting plates 37, which have now been moved into container receiving position.

This cycle of operation is repeated as long as containers are supplied to the loading conveyer until the first container actuates the switch 105. The actuation of the switch 105 causes the upper pusher bar 73 to move transversely over the intermediate conveyer pushing the first eight containers onto the platform 97, over the lower pusher bar 98 and onto the transverse angle members 99 of the lowering assembly.

When the upper pusher bar 73 starts its forward movement, the valve 65 is closed so that the conveyer ram and the slide stop ram are rendered inoperative. The intermediate conveyer is thus held stationary during the forward movement of the upper pusher bar. When the upper pusher bar 73 completes its forward movement, the switches 106 and 148 are actuated and the direction of movement of the upper pusher bar is reversed. The backward or return movement of the upper pusher bar causes the valve 65 to open so that the conveyer ram and slide stop ram are again rendered operative and the intermediate conveyer is advanced progressively as containers are loaded upon it. The upper pusher rod is raised by means of the ramps 109 over the succeeding containers being moved into position by the intermediate conveyer and then falls behind the next group of eight containers to its original position.

In the meanwhile, the actuation of the switch 148 caused the lower pusher bar 98 to move forwardly to push the first group of containers off the transverse angle members 99 of the lowering assembly, as the latter moves downwardly, onto the bottom of the tank 25. When the forward movement of the lower pusher bar 98 has been completed and the first group rests on the bottom of the tank 25, the switch 149 is actuated and the lower pusher bar moves rearwardly to its original position as the lowering assembly returns to its original position.

This sequence of operations is then repeated when the first container of the second group of eight actuates the switch 105. The containers of the second group contact the containers of the first group already resting on the bottom of the tank to push them forwardly over the tank bottom wall between the risers 157 thereof toward the discharge end of the tank as the second group is pushed forwardly by the lower pusher rod 98. In this manner, succeeding groups of containers push preceeding groups through the tank.

The four way control valves are of conventional design having a body 160 (Figures 12 and 13) which is provided with an inlet 161 which communicates with an outer passage 162. An inner chamber 163 of the body 160 is provided with a sleeve 164. The sleeve 164 has a middle row of apertures 165 which communicate with the outer passage through a middle annular passage 166 of the body so that compressed air flows to the interior of the sleeve from the inlet 161 through the middle annular passage 166 and the apertures 165. The body is also provided with a pair of outlets 167 and 168. The outlet 167 communicates with the interior of the sleeve through an end annular passage 169 of the body and an end row of apertures 170 of the sleeve. Similarly, the outlet 168 communicates with the interior of the sleeve through the opposite end annular passage 171 of the valve body and the opposite end row of apertures 172.

A piston 173 is slidably mounted in the sleeve 164 and includes a pair of packing or seal rings 174 and 175 held in spaced relation by the spring 176. The opposite ends 177 and 178 of the piston bear against plungers 179 and 180 disposed in the chamber 163 of the body at opposite ends of the sleeve. The plungers 179 and 180 are provided with rings or packing 181a which seal between the plungers and the walls of the body defining the chamber 163. The plungers 179 and 180 have reduced extensions 181 and 182, respectively, which extend into the central bores of the end closures 183 and 184, respectively. The extensions 181 and 182 are provided with rings or packing 185 which seal between the extensions and the walls of the end closures. However, each of the walls is beveled as at 186 so that each ring 185 seals between the walls of its end closure and the extension only after the extension has been moved outwardly to a closed position.

The bores of the end closures are connected to the bleeder valves or switches by suitable conduits as shown in Figure 11.

The piston 173 is moved alternately in opposite directions due to the air pressure exerted on opposite sides of the plungers 179 and 180 which is applied to the plungers through the passages 186 and 187 which communicate with the outer passage 162.

It will be seen now that when the bleeder valves or switches connected to the end closures 183 and 184 are both closed, the pressure applied to opposite ends of the piston is equal and that air may flow from the inlet 161 through the middle annular passage 166, the middle row of apertures 165, the outer end row of apertures 170 and the outer end passage 169 to the outlet 167. At the same time air may flow from the outlet 168 to the exhaust port 188 through the end annular passage 171, the end row of apertures 172, and the side passage 189 which communicates with the interior of the sleeve and the exhaust 188.

If the bleeder valve or switch which closes the conduit connected to the end closure 184 is now opened, the pressure on the outer side of the plunger 180 is relieved and the pressure on the opposite side of the plunger 179 will move the piston to the right whereby the packing 174 will be disposed between the end row of apertures 170 and the middle row of apertures so that now the outlet 168 will be supplied with compressed air and the outlet 167 will be connected to the exhaust 188 through the side passage 190. It will be noted that as the extension 182 moves outwardly, its O ring 185 will move past the beveled portion 186 of the end closure 184 and prevent further flow of air through the end closure so that even if the bleeder valve or switch at the end of the conduit connected to the end closure 184 remains open, no flow of air from the end closure can take place. Conversely, if the bleeder valve or switch on the conduit connected to the end closure 183 is opened, the piston 173 is moved back to its original position.

It will now be seen that each pair of bleeder valves or switches of each control valve will move the piston 173 of its valve alternately to control operation of the pneumatic ram whose cylinder is supplied with compressed air from the outlets 167 and 168 of its associated valve.

Manifestly, the construction as shown and described is capable of some modification and such modification as may be construed to fall within the scope and meaning of the appended claims is also considered to be within the spirit and intent of the invention.

What is claimed is:

1. A conveyor system comprising a frame, relatively parallel upper and lower longitudinally reciprocable members on each side of said frame, an intermediate conveyor operating parallel with one end of said frame, means on the loading end of said intermediate conveyer for loading articles on the intermediate conveyer, an upper article pusher assembly connected to one end of each of the upper of said reciprocable members, means for advancing articles by said conveyer progressively into alignment with said upper pusher assembly, an article lowering assembly suspended from one end of each of said lower reciprocable members, said upper pusher assembly including a first pusher bar mounted for movement transversely over said conveyor to move said articles off said conveyer onto said lowering assembly, and a second pusher assembly including a second pusher bar extending from one to the other of said lower reciprocable members for movement thereby transversely over said lowering assembly to move said articles off said lowering assembly.

2. A conveyer system comprising a rectangular tank having a frame along its sides and an end, an intermediate conveyer operating parallel with one end of said tank and supported by said frame, means on the loading end of said intermediate conveyer for loading articles on the intermediate conveyer, an upper and a lower gear rack on each side of said frame adapted for longitudinal reciprocation, an upper pusher assembly supported by said upper gear racks, means for advancing articles by said conveyer progressively into alignment with said upper pusher assembly, a lowering assembly supported by said lower gear racks, said upper pusher assembly including a first pusher bar mounted for movement transversely over said conveyer to move said articles off said conveyer onto said lower assembly, a second pusher assembly supported by said lower gear racks including a second pusher bar mounted for movement transversely along a plane between said first pusher bar and said lowering assembly to move said articles off said lowering assembly into said tank, a first means for effecting simultaneous reciprocation of said upper gear racks, a second means for simultaneous reciprocation of said lower gear racks, a third means for advancing said conveyer, and a first control means for preventing operation of said third means when said first pusher bar is moved transversely over said intermediate conveyer to move said articles off said conveyer.

3. A conveyer system comprising a frame, an upper and a lower gear rack reciprocably mounted on each side of said frame, an intermediate conveyer operating parallel with one end of said frame, means on the loading end of said intermediate conveyer for loading articles on the intermediate conveyer, means for advancing articles by said conveyer progressively, an upper pusher assembly supported by said upper gear racks, a lowering assembly supported by said lower gear racks, said upper pusher assembly including a first pusher bar mounted for movement transversely over said conveyer to move said articles off said conveyer onto said lowering assembly, a second pusher assembly suported by said lower gear racks including a second pusher bar mounted for movement below said first pusher bar and transversely over said lowering assembly to move said articles off said lowering assembly, means interconnecting said second pusher assembly and said lowering assembly to cause said second pusher bar to move articles off said lowering assembly as said lowering assembly moves downwardly.

4. A conveyer system comprising a frame, a longitudinally reciprocable upper gear rack on each side of said frame, a longitudinally reciprocable lower gear rack on said frame below each of said upper gear racks, an intermediate conveyer, means for advancing said conveyer progressively alongside one end of said frame, means on the loading end of said intermediate conveyer for loading articles on the intermediate conveyer, a horizontally and vertically movable upper pusher assembly connected to said upper gear racks, a lowering assembly connected to said lower gear racks, a first pusher bar mounted on said upper pusher assembly for movement thereby transversely over said conveyer to move said articles off said conveyer onto said lowering assembly, a second pusher assembly mounted on said lower gear racks, a second pusher bar mounted on said second pusher assembly for movement thereby transversely over said lowering assembly to move said articles off said lowering assembly, a control means for preventing operation of said conveyer operating means when said first pusher bar is moved transversely over said intermediate conveyer to move said articles off said conveyer, means interconnecting said second pusher assembly and said lowering assembly to cause said second pusher bar to move articles off said lowering assembly as said lowering assembly moves downwardly.

5. A conveyer system comprising a frame, an upper longitudinally reciprocable member on each side of said frame, a lower longitudinally reciprocable member below each of said upper and longitudinally reciprocable members, a loading conveyer parallel with one side of said frame, an intermediate conveyer along one end of said frame, said loading conveyer delivering articles to said intermediate conveyer, stop means for preventing movement of articles off said loading conveyer onto said intermediate conveyer when said intermediate conveyer is in motion, an upper pusher assembly connected to said upper reciprocable members, means for advancing articles by said conveyer progressively toward said upper pusher assembly, a lowering assembly connected to said lower reciprocable members, said upper pusher assembly comprising a first pusher bar mounted thereon for movement thereby transversely over said intermediate conveyer to move said articles off said intermediate conveyer onto said lowering assembly, a second pusher assembly carried by said lower reciprocable members, and a second pusher bar mounted on said second pusher assembly thereby for movement transversely over said lowering assembly to move said articles off said lowering assembly.

6. A conveyer system comprising a frame, an upper longitudinally reciprocable member on each side of said frame, a lower longitudinally reciprocable member on each side of said frame, a loading conveyer parallel with one side of said frame, an intermediate conveyer parallel with one end of said frame, said loading conveyer delivering articles to said intermediate conveyer, stop means for preventing movement of articles off said loading conveyer onto said intermediate conveyer when said intermediate conveyer is in motion, an upper pusher assembly connected to and operated by said upper longitudinally reciprocable members, means for advancing articles by said intermediate conveyer progressively toward said upper pusher assembly, a lowering assembly carried by said lower reciprocable members below the plane thereof, a first pusher bar mounted on said first pusher assembly for movement thereby transversely over said intermediate conveyer to move said articles off said intermediate conveyer onto said lowering assembly, a second pusher assembly carried by said lower reciprocable members, a second pusher bar mounted on said second pusher assembly for movement thereby transversely over said lowering assembly to move said articles off said lowering assembly, a first means for progressively advancing said intermediate conveyer; a second means for operating said stop means, control means for said second means for causing said stop means to operate to stop movement of articles off said loading conveyer when said first means is operating to move said intermediate conveyer, and a second control means for preventing operation of said first means when said first pusher bar is moved transversely over said intermediate conveyer to move said articles off said conveyer.

7. A conveyer system comprising a freezing tank, a frame disposed about the side and an end of said tank, a loading conveyer parallel with one side of said tank, an intermediate conveyer parallel with one end of said tank, said loading conveyer delivering articles to said intermediate conveyer, stop means for preventing movement of articles off said loading conveyer onto said intermediate conveyer when said intermediate conveyer is in motion, an upper reciprocable member mounted parallel with each side of said frame, a lower reciprocable member below each of said upper reciprocable members, an upper pusher assembly carried by said upper reciprocable members; a lowering assembly carried by said lower reciprocable members, a first pusher bar mounted on said upper pusher assembly for movement thereby transversely over said intermediate conveyer to move said articles off said intermediate conveyer onto said lowering assembly, a second pusher assembly carried by said lower reciprocable members, a second pusher bar mounted on said second pusher assembly for movement thereby transversely over said lowering assembly to move said articles off said lowering assembly into said freezing tank, a first means for progressively advancing said intermediate conveyer, a second means for operating said stop means, control means for said second means for causing said stop means to operate to stop movement of articles off said loading conveyer when said first means is operating to move said intermediate conveyer, a second control means for preventing operation of said first means when said first pusher bar is moved transversely over said intermediate conveyer to move said articles off said conveyer, and a third control means for preventing operation of said first means when said intermediate conveyer has moved a predetermined number of articles adjacent said first pusher bar.

8. A conveyer system comprising a freezing tank, a frame embracing the sides and an end of said tank, a loading conveyer supported by said frame along one side of said tank, an intermediate conveyer parallel with an end of said tank, said loading conveyer delivering articles to said intermediate conveyer, stop means for preventing movement of articles off said loading conveyer onto said intermediate conveyer when said intermediate conveyer is in motion, an upper longitudinally reciprocable gear rack mounted on each side of said frame, a lower reciprocable gear rack on said frame below each of said upper gear racks, an upper pusher assembly carried by said upper gear racks, a lowering assembly carried by said lower gear racks, a first pusher bar mounted on said upper pusher assembly for movement thereby transversely over said intermediate conveyer to move said articles off said intermediate conveyer onto said lowering assembly, a second pusher assembly carried by said lower gear racks, a second pusher bar mounted on said second pusher assembly for movement thereby transversely over said lowering assembly to move said articles off said lowering assembly, a first means for progressively advancing articles by said intermediate conveyer into alignment with said first pusher bar, a second means for operating said stop means, control means for said second means for causing said stop means to operate to stop movement of articles off said loading conveyer when said first means is operating to move said intermediate conveyer, a second control means for preventing operation of said first means when said first pusher bar is moved transversely over said intermediate conveyer to move said articles off said conveyer, and means interconnecting said second pusher assembly and said lowering assembly to cause said second pusher bar to move articles off said lowering assembly as said lowering assembly moves downwardly.

9. A conveyer system comprising a frame, a loading conveyer parallel with one side of said frame, an intermediate conveyer parallel with one end of said frame, said loading conveyer delivering articles to said intermediate conveyer, stop means for preventing movement of articles off said loading conveyer onto said intermediate conveyer when said intermediate conveyer is in motion, an upper longitudinally reciprocable gear rack on each side of said frame, a lower longitudinally reciprocable gear rack on said frame below each of said upper gear racks, an upper pusher assembly carried by said upper gear racks, a lowering assembly connected to said lower gear racks, a first pusher bar mounted on said upper pusher assembly for movement thereby transversely over said conveyer to move said articles off said intermediate conveyer onto said lowering assembly, a second pusher assembly connected to said lower gear racks, a second pusher bar mounted on said second pusher assembly for movement thereby transversely over said lowering assembly to move said articles off said lowering assembly, a first means for progressively advancing articles by said intermediate conveyer into alignment with said first pusher bar, a second means for operating said stop means, control means for said second means for causing said stop means to operate to stop movement of articles off said loading conveyer when said first means is operating to move said intermediate conveyer, a second control means for preventing operation of said first means when said first pusher bar is moved transversely over said intermediate conveyer to move said articles off said conveyer, a third control means for preventing operation of said first means when said intermediate conveyer has moved a predetermined number of articles adjacent said first pusher bar, and means interconnecting said second pusher assembly and said lowering assembly to cause said second pusher bar to move articles off said lowering assembly as said lowering assembly moves downwardly.

10. A conveyer system comprising a frame, a loading conveyer mounted on one side of said frame an intermediate conveyer mounted on one end of said frame, said loading conveyer delivering articles to said intermediate conveyer stop means for preventing movement of articles off said loading conveyer onto said intermediate conveyer when said intermediate conveyer is in motion, an upper and a lower longitudinally reciprocable member on each side of said frame an upper pusher assembly connected to said upper reciprocable members, a lowering assembly connected to said lower reciprocable member, a first pusher bar mounted on said upper pusher assembly for movement thereby transversely over said conveyer to move said articles off said intermediate conveyer onto said lowering assembly, a second pusher assembly mounted on said lower reciprocable members, a second pusher bar mounted on said second pusher assembly for movement thereby transversely over said lowering assembly to move said articles off said lowering assembly, a first means for progressively advancing articles by said intermediate conveyer into alignment with said first pusher bar; a second means for operating said stop means, control means for said second means for causing said stop means to operate to stop movement of articles off said loading conveyer when said first means is operating to move said intermediate conveyer, a second control means for preventing operation of said first means when said first pusher bar is moved transversely over said intermediate conveyer to move said articles off said conveyer, and a third means for moving said first pusher bar transversely over said intermediate conveyer, and a third control means for placing said third means in operation to move said first pusher bar to move articles off said intermediate conveyer when said intermediate conveyer has moved a predetermined number of articles adjacent said first pusher bar.

11. A conveyer system for moving articles in groups of predetermined numbers from a loading conveyer into a tank comprising a frame embracing the sides and an end of said tank, an intermediate conveyer for receiving articles one by one from the loading conveyer and moving said articles to positions adjacent said tank, an upper and a lower longitudinally reciprocable gear rack mounted on each side of said frame, a lowering assembly below said lower gear racks for receiving groups of articles and lowering them into said tank, a horizontally and vertically movable pusher bar carried by said upper gear racks transversely of said tank for moving groups of articles off said intermediate conveyer onto said lowering assembly, a horizontally movable pusher bar carried by said lower gear racks in parallelism with said first pusher bar for moving said articles off said lowering assembly into said tank as said lowering assembly lowers said articles into said tank, and means for reciprocating said gear racks.

12. A conveyer system for moving articles in groups of predetermined numbers from a loading conveyer into a freezing tank comprising first members disposed for longitudinal reciprocation at the sides of said tank and second members reciprocably disposed in parallelism below said first members, an intermediate conveyer for receiving articles one by one from the loading conveyer and moving said articles to positions adjacent said tank, a lowering assembly disposed below said second reciprocable members for receiving groups of articles and lowering them into said tank, a first pusher bar extending from one to the other of said first reciprocable members for engaging and moving groups of articles off said intermediate conveyer onto said lowering assembly, a second pusher bar extending from one to the other of said second reciprocable members for engaging and moving said articles off said lowering assembly into said tank as said lowering assembly lowers said articles into said tank, and means for automatically operating said intermediate conveyer, said first and second reciprocable members and said lowering assembly whereby articles are delivered in said groups to said tank.

13. The structure of claim 12, and a stop means for preventing movement of articles off said loading conveyer onto said intermediate conveyer when said intermediate conveyer is in motion.

14. The structure of claim 12, and means for automatically operating said intermediate conveyer, said first and second reciprocable members, said lowering assembly and said stop means whereby articles are delivered in said groups of predetermined numbers to said tank.

References Cited in the file of this patent

UNITED STATES PATENTS

| | | |
|---|---|---|
| 1,142,025 | Christoe | June 8, 1915 |
| 1,289,208 | Lents | Dec. 31, 1918 |
| 1,559,199 | Straight | Oct. 27, 1925 |
| 1,911,093 | Shackelford | May 23, 1933 |